United States Patent
Lee et al.

(10) Patent No.: US 10,890,671 B2
(45) Date of Patent: Jan. 12, 2021

(54) TIME-BASED SIGNAL ACQUISITION APPARATUS AND METHOD USING SAWTOOTH-SHAPED THRESHOLD VOLTAGE

(71) Applicant: SEOUL NATIONAL UNIVERSITY R&DB FOUNDATION, Seoul (KR)

(72) Inventors: Jae Sung Lee, Seoul (KR); Guen Bae Ko, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 237 days.

(21) Appl. No.: 15/954,733

(22) Filed: Apr. 17, 2018

(65) Prior Publication Data

US 2018/0299566 A1 Oct. 18, 2018

(30) Foreign Application Priority Data

Apr. 17, 2017 (KR) .................. 10-2017-0049246

(51) Int. Cl.
*G01T 1/208* (2006.01)
*G01T 1/20* (2006.01)

(52) U.S. Cl.
CPC ............ *G01T 1/208* (2013.01); *G01T 1/2018* (2013.01)

(58) Field of Classification Search
CPC ..... G01T 1/208; G01T 1/2018; G01T 1/1663; G01T 1/17
See application file for complete search history.

(56) References Cited

U.S. PATENT DOCUMENTS

| 4,645,918 A * | 2/1987 | Tsuchiya ............... H01J 31/502 250/214 VT |
| 2015/0372689 A1* | 12/2015 | Xi ....................... H03M 1/1019 341/118 |

FOREIGN PATENT DOCUMENTS

| JP | H05-152909 A | 6/1993 |
| JP | H09-133772 A | 5/1997 |
| JP | 5531021 B2 | 6/2014 |
| KR | 10-2016-0050686 A | 5/2016 |
| KR | 10-1687522 B1 | 12/2016 |

* cited by examiner

*Primary Examiner* — David P Porta
*Assistant Examiner* — Meenakshi S Sahu
(74) *Attorney, Agent, or Firm* — Korus Patent, LLC; Seong Il Jeong

(57) ABSTRACT

Disclosed herein are a time-based signal acquisition apparatus and method using sawtooth-shaped threshold voltage. The signal acquisition apparatus for acquiring the information of a scintillation signal includes a sawtooth-shaped voltage generation unit and a signal comparison unit. The sawtooth-shaped voltage generation unit generates a sawtooth-shaped threshold voltage which increases when the threshold voltage is smaller than a voltage value of the scintillation signal and which decreases to an initial value when the threshold voltage is larger than the voltage value of the scintillation signal. The signal comparison unit receives the scintillation signal, compares the voltage value of the scintillation signal with the threshold voltage, and generates a digital pulse train.

14 Claims, 9 Drawing Sheets

TIME-BASED SIGNAL ACQUISITION APPARATUS AND METHOD USING SAWTOOTH-SHAPED THRESHOLD VOLTAGE

BACKGROUND

1. Technical Field

The present invention relates generally to a time-based signal acquisition apparatus and method using sawtooth-shaped threshold voltage, and more specifically to a time-based signal acquisition apparatus and method which are capable of precisely and economically measuring the energy and arrival time information of a radioactive ray detected from a scintillation signal generated by a radiation detector.

2. Description of the Related Art

Various methods have been used to compute the energy and detection time information of a radioactive ray detected from a scintillation signal generated by a radiation detector. The energy of the radioactive ray is obtained from the integration of the signal or the maximum height of the signal, and the detection time information thereof is computed as the time at which the signal starts to be generated. Accordingly, the energy and arrival time information of the radioactive ray can be accurately computed only if the signal generated by the radiation detector can be precisely measured.

Furthermore, in the case of a radiation detector configured such that the decay time of a scintillation signal varies depending on different types of scintillation crystals other than a single scintillation crystal or reaction locations through the special processing of a scintillation crystal, the type of scintillation crystal or the reaction location can be determined via the decay time of the signal. Accordingly, it is necessary to be able to accurately estimate the height, generation time and decay time of a signal in the signal of the radiation detector.

Conventional methods for acquiring information from a scintillation signal include a method using a charge-to-digital converter (hereinafter referred to as a "QDC") and a method using an analog-to-digital converter (hereinafter referred to as an "ADC"). These two methods are advantageous in that energy information can be most accurately acquired.

However, the method using a QDC is the technology which accumulates charges, emitted from a radiation detector, in a capacitor for a predetermined period (charge integration) and then reads the accumulated charges. The method using a QDC is disadvantageous in that a time-to-digital converter (hereinafter referred to as a "TDC") is additional required to acquire detection time information because the detection time information cannot be measured, and is also disadvantageous in that two charge-to-digital converters (QDCs) having different charge integration intervals are required to estimate decay time information.

The method using an ADC is advantageous in that energy, detection time and decay time information can be simultaneously acquired. The method using an ADC having a sampling rate of tens to hundreds of MHz requires a TDC because it cannot precisely compute detection time information. Although the method using an ADC having a sampling rate of several GHz can precisely measure time information, it is disadvantageous in that it is very expensive and multichannel expansion is impossible due to serious heat radiation.

A QDC and an ADC are relatively expensive, and are unfavorable for an increase in the level of integration which enables the handling of thousands to tens of thousands of signals. Accordingly, recently, there has been proposed a time-based signal acquisition technology which acquires information by using only TDC.

Time-over-Threshold (hereinafter referred to as "ToT"), i.e., one of the time-based signal acquisition technologies, is the simplest time-based signal acquisition method. ToT is a technology which measures the energy of a scintillation signal by measuring the width of a waveform above a specific threshold voltage in the scintillation signal. In this case, the detection time of the scintillation signal is acquired from the leading edge of an output signal.

However, ToT is disadvantageous in that a ToT value is not proportional to but has a logarithmic relationship with actually detected energy, and is also disadvantageous in that it is sensitive to noise, thus resulting in poor energy resolution, i.e., poor energy detection performance. Furthermore, this method is disadvantageous in that it cannot estimate the decay time of a scintillation signal. Moreover, there is a tradeoff between the energy and the precision of time measurement depending on the setting of threshold voltage.

Conventional technologies which improve the energy linearity of ToT include: multi-voltage threshold (hereinafter referred to as "MVT") which uses multiple threshold voltages; dynamic threshold (hereinafter referred to as "dToT") in which threshold voltage varies depending on the energy of a scintillation signal; and a charge-to-time converter (hereinafter referred to as a "QTC") in which a circuit is linearized such that a ToT value is output in proportion to the charge of a scintillation signal.

Although the MVT technology is a technology which can improve energy linearity by simultaneously using different types of ToT having different threshold voltages, it is disadvantage in that large numbers of comparators and digital channels are required. The dToT technology and the QTC technology are disadvantageous in that precise time measurement cannot be made because time information is sacrificed for the improvement of energy linearity.

Meanwhile, the above-described background art corresponds to technical information which has been possessed by the present inventor in order to conceive the present invention or which has been acquired in the process of conceiving the present invention, and is not necessarily considered to be a well-known technology that had been known to the public before the filing date of the present invention.

SUMMARY

An object of at least one embodiment of the present invention is to provide a time-based signal acquisition apparatus and method using sawtooth-shaped threshold voltage, which are intended to acquire energy and time information from a scintillation signal.

An object of at least one embodiment of the present invention is to provide a time-based signal acquisition apparatus and method using sawtooth-shaped threshold voltage, which are capable of precisely estimating energy and time information from a scintillation signal without requiring the use of an expensive apparatus.

An object of at least one embodiment of the present invention is to provide a time-based signal acquisition apparatus and method using sawtooth-shaped threshold voltage, which are unsusceptible to noise because information is acquired from various sampling points.

In order to accomplish at least one of the above objects, according to a first aspect of the present invention, there is provided a signal acquisition apparatus for acquiring the information of a scintillation signal, the signal acquisition apparatus including: a sawtooth-shaped voltage generation unit configured to generate a sawtooth-shaped threshold voltage which increases when the threshold voltage is smaller than a voltage value of the scintillation signal and which decreases to an initial value when the threshold voltage is larger than the voltage value of the scintillation signal; and a signal comparison unit configured to receive the scintillation signal, to compare the voltage value of the scintillation signal with the threshold voltage, and to generate a digital pulse train.

According to a second aspect of the present invention, there is provided a signal acquisition method which is performed by a signal acquisition apparatus for acquiring the information of a scintillation signal, the signal acquisition method including: receiving a scintillation signal; generating a sawtooth-shaped threshold voltage which increases when the threshold voltage is smaller than a voltage value of the scintillation signal and which decreases to an initial value when the threshold voltage is larger than the voltage value of the scintillation signal; comparing the voltage value of the scintillation signal with the threshold voltage, and generating a digital pulse train; and computing at least one of energy information and detection time information of the scintillation signal based on the digital pulse train.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
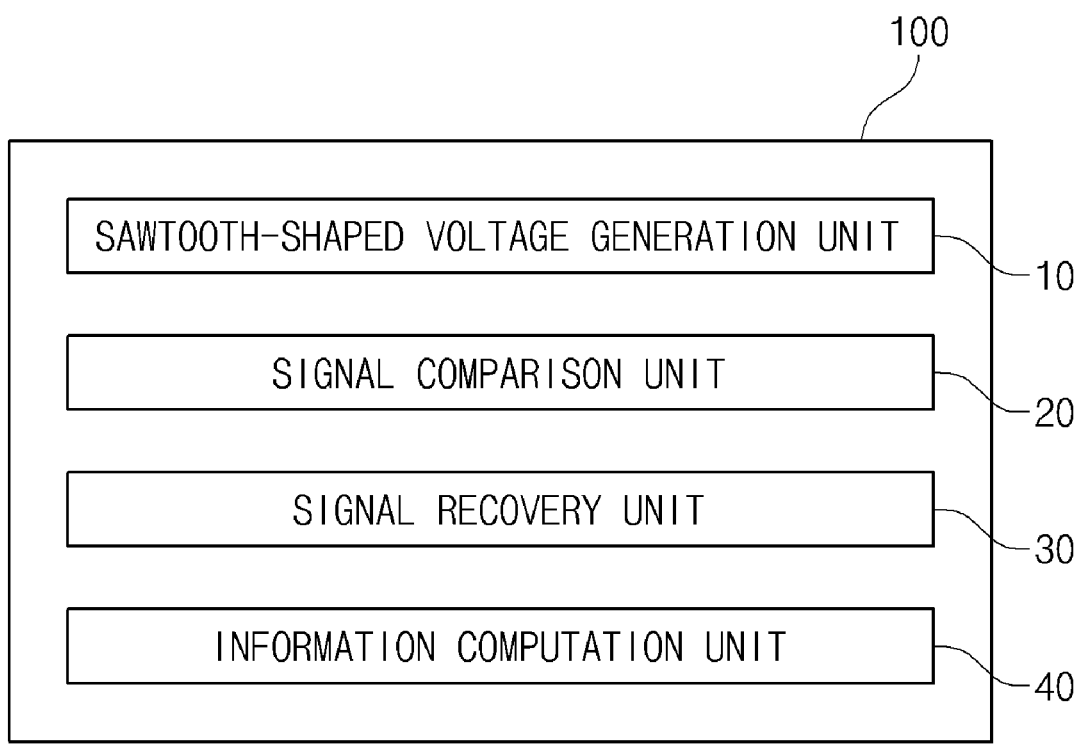
FIG. 1 is a block diagram showing the functional configuration of a signal acquisition apparatus according to an embodiment of the present invention.

Embodiments of the present invention will be described in detail below with reference to the accompanying drawings so that those having ordinary knowledge in the art to which the present invention pertains can easily practice the present invention. However, the present invention may be implemented in various different forms, and are not limited to the embodiments described herein. Furthermore, in the drawings, parts unrelated to the following description will be omitted in order to clearly describe the present invention. Throughout the specification, like reference symbols will be assigned to like components.

Throughout the specification, when a part is described as being "connected" to another part, this includes not only a case where they are "directly connected" to each other but also a case where they are "electrically connected" to each other with another component interposed therebetween. Furthermore, when a part is described as "including" a component, this means that another component is not be excluded from the part but may be included in the part, unless particularly described to the contrary.

The present invention will be described in detail below with reference to the accompanying drawings.

Figure 2:
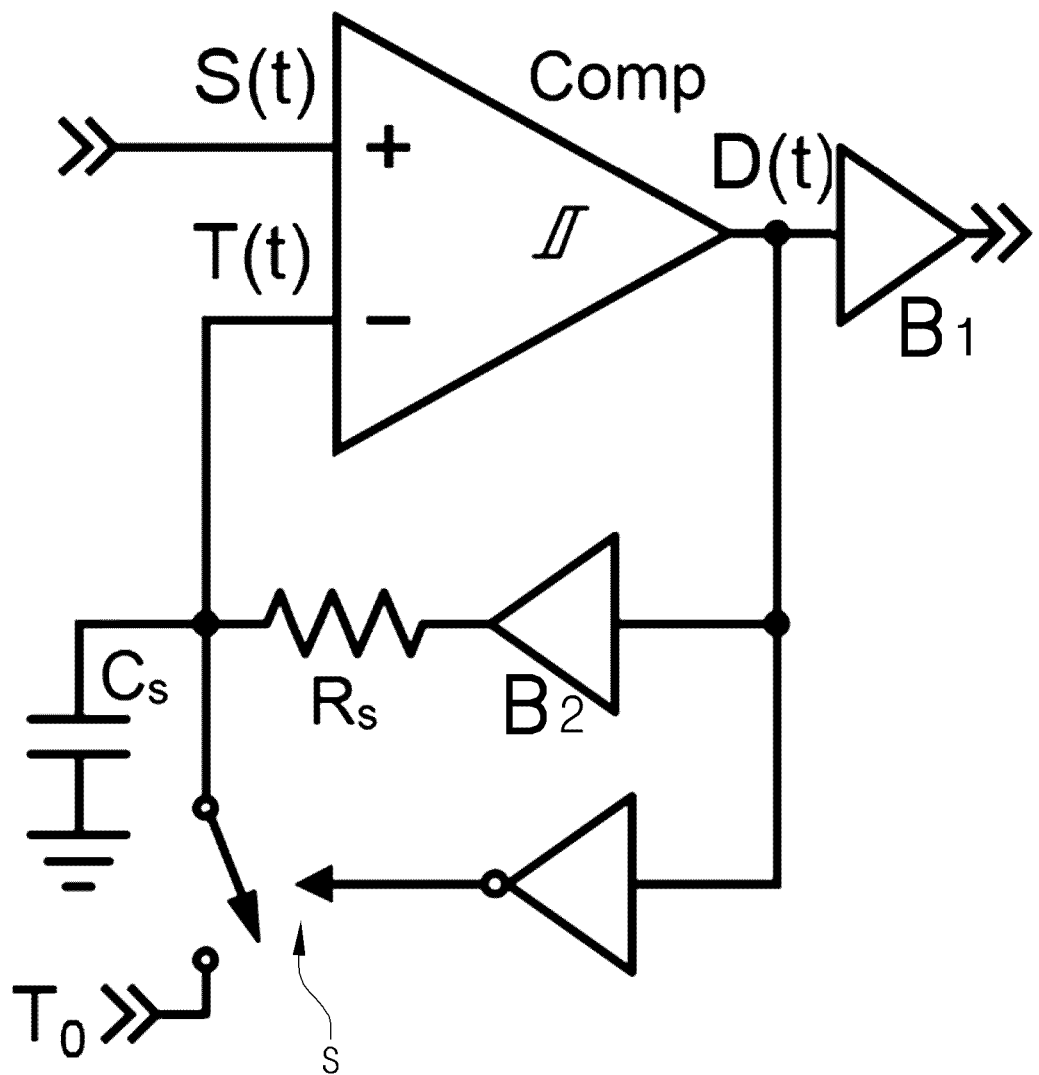
FIG. 2 is a circuit diagram of the signal acquisition apparatus according to the embodiment of the present invention.
Figure 3:
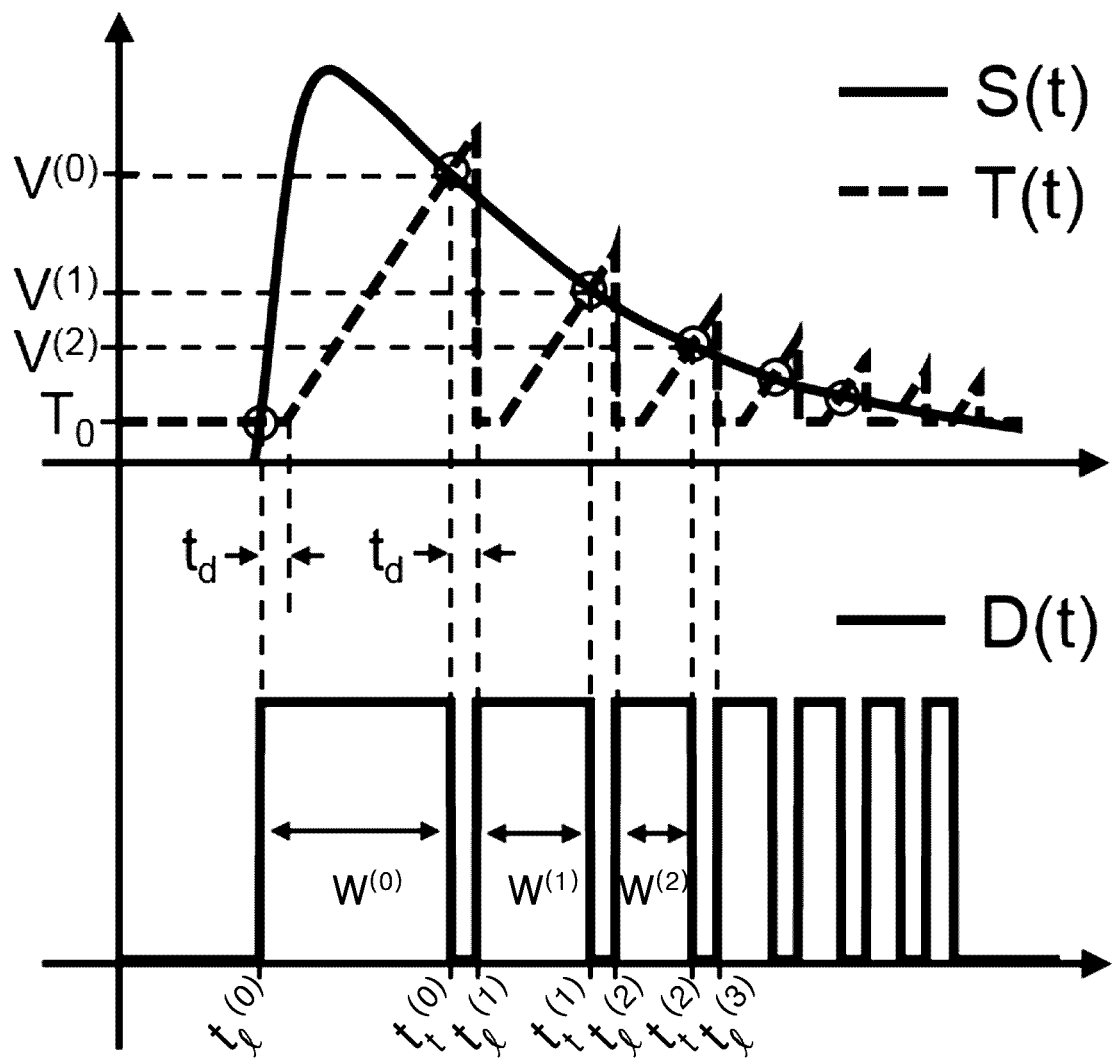
FIG. 3 is a graph showing the waveform of a signal obtained using the signal acquisition apparatus according to the embodiment of the present invention.
Figure 4:
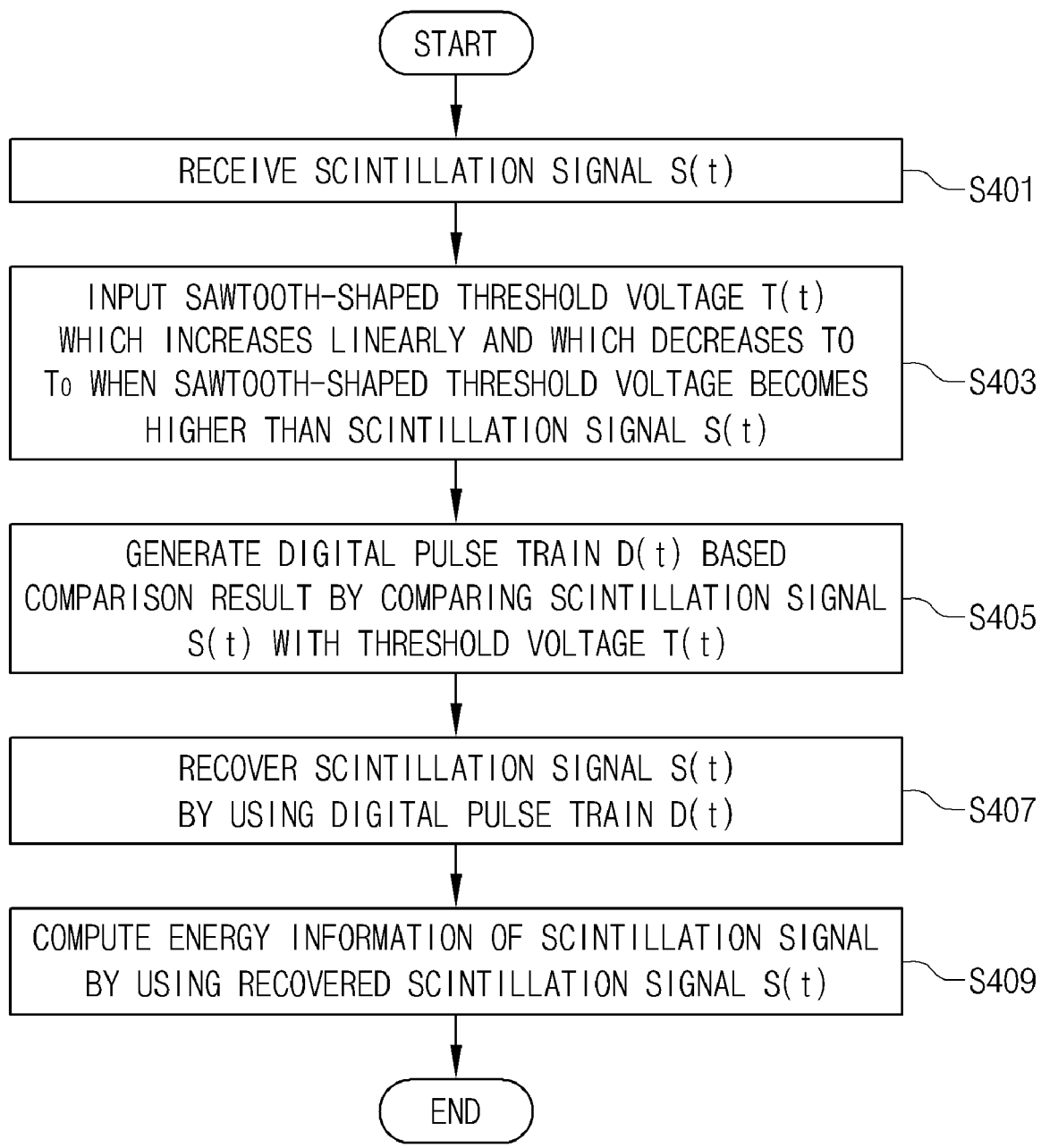
FIG. 4 is a flowchart showing a signal acquisition method according to an embodiment of the present invention in a stepwise manner.

A signal acquisition apparatus and a signal acquisition method using the signal acquisition apparatus according to embodiments of the present invention will be described with reference to FIGS. 1 to 4. FIG. 1 is a block diagram showing the functional configuration of a signal acquisition apparatus according to an embodiment of the present invention. FIG. 2 is a circuit diagram of the signal acquisition apparatus according to the embodiment of the present invention. FIG. 3 is a graph showing the waveform of a signal obtained using the signal acquisition apparatus according to the embodiment of the present invention. FIG. 4 is a flowchart showing a signal acquisition method according to an embodiment of the present invention in a stepwise manner.

As shown in FIG. 1, a signal acquisition apparatus 100 according to an embodiment of the present invention includes a sawtooth-shaped voltage generation unit 10. The sawtooth-shaped voltage generation unit 10 generates a sawtooth-shaped threshold voltage T(t) shown in FIG. 3. More specifically, the sawtooth-shaped voltage generation unit 10 may generate a sawtooth-shaped threshold voltage T(t) having a value which increases from an initial threshold voltage $T_0$ over time and which decreases back to the initial threshold voltage $T_0$ when the value becomes larger than a scintillation signal S(t). However, the waveform of the sawtooth-shaped threshold voltage T(t) shown in FIG. 3 is merely an example. The sawtooth-shaped threshold voltage T(t) generated by the signal acquisition apparatus 100 according to the embodiment of the present invention may have a waveform having a value which rapidly increases from the initial threshold voltage $T_0$ and which gradually decreases over time when the value becomes larger than the scintillation signal S(t). As another example, the sawtooth-shaped threshold voltage T(t) generated by the signal acquisition apparatus 100 according to the embodiment of the present invention may have a sawtooth shape which gradually increases from an initial threshold voltage $T_0$ over time and which gradually decreases when the value of the sawtooth shape becomes larger than the scintillation signal S(t). However, for ease of description, the following description will be given with a focus on a method of generating the threshold voltage T(t) having a sawtooth waveform shown in FIG. 3 and then computing the energy of a scintillation signal.

To generate the threshold voltage T(t) according to the embodiment shown in FIG. 3, the sawtooth-shaped voltage generation unit 10 may be configured to include a low-pass filter, including a resistor $R_S$ and a capacitor $C_S$, and an analog switch, as shown in FIG. 2. In this case, the analog switch S may be controlled to enter a closed state when the output of a comparator Comp to be described later is 0, and may be controlled to enter an open state when the output of the comparator is 1. In this case, to control the analog switch S in response to the output of the comparator Comp, the signal acquisition apparatus 100 may include an inverter I configured to receive and invert the output of the comparator Comp.

In this case, the threshold voltage T(t) has a predetermined initial threshold voltage $T_0$ when the analog switch S is in a closed state. In other words, the analog switch S is selectively connected to a power supply which outputs the predetermined initial threshold voltage $T_0$. Furthermore, the threshold voltage T(t) is gradually increased by the low-pass filter when the analog switch S enters an open state.

In this case, the initial threshold voltage $T_0$ may be set above the baseline of a scintillation signal, as shown in FIG. 3.

Furthermore, the signal acquisition apparatus 100 according to the embodiment of the present invention may further include a signal comparison unit 20. The signal comparison unit 20 may compare the voltage values of the scintillation signal S(t) and the threshold voltage T(t), and may then output a digital pulse train having different values when the value of the scintillation signal S(t) is larger than that of the threshold voltage T(t) and when the value of the scintillation signal S(t) is smaller than that of the threshold voltage T(t).

The signal comparison unit 20 may be configured to include the comparator Comp configured to receive a scintillation signal S(t) and a threshold voltage T(t) and then output a digital output signal D(t), as shown in FIG. 2. The comparator Comp may output 1 when the scintillation signal S(t) is higher than the threshold voltage T(t), and may output when the scintillation signal S(t) is lower than the threshold voltage T(t), as shown in FIG. 3. In response to this, the output of the digital pulse train may be generated.

Meanwhile, as described above, the inverter I of the sawtooth-shaped voltage generation unit 10 inverts the output D(t) of the comparator Comp and controls the analog switch S. Accordingly, when the threshold voltage T(t) having a value which is increased over time by the low-pass filter becomes higher than the scintillation signal S(t), the output of the comparator Comp becomes 0, and thus the output of the inverter I becomes 1. Therefore, when the analog switch S is switched to a closed state, and thus the threshold voltage T(t) is decreased to the initial threshold voltage $T_0$. In other words, the sawtooth-shaped voltage generation unit 10 receives the feedback of the output of the signal comparison unit 20, and uses the feedback to generate sawtooth-shaped voltage.

Furthermore, as shown in FIG. 2, the signal acquisition apparatus 100 may include two buffers B1 and B2 as circuit components in order to transfer the output D(t) of the comparator Comp to the low-pass filter or output the output D(t) of the comparator Comp to the outside.

Furthermore, until the scintillation signal S(t) becomes lower than $T_0$, the signal acquisition apparatus 100 according to the embodiment of the present invention compares the sawtooth-shaped threshold voltage T(t) with the scintillation signal S(t) and outputs the digital pulse train.

However, the circuit configuration of the signal acquisition apparatus 100 shown in FIG. 2 is merely an example which is used to generate the sawtooth-shaped threshold voltage T(t) by the signal acquisition apparatus 100 according to the present invention, as described above. The signal acquisition apparatus 100 according to the present invention is not limited to the circuit configuration shown in FIG. 2.

Meanwhile, referring back to FIG. 1, the signal acquisition apparatus 100 according to the embodiment of the present invention may further include a signal recovery unit 30. The signal recovery unit 30 may recover the scintillation signal by using the output of the above-described signal comparison unit 20, i.e., the digital pulse train.

More specifically, as shown in FIG. 3, the voltage values of points shown in the form of red circles in FIG. 3 may be computed using the times, at which the leading edges and/or trailing edges of pulses included in the digital pulse train D(t) output through the comparison between the scintillation signal S(t) and the threshold voltage T(t) appear, and the slopes Δa of the threshold voltages of the digital pulse train D(t). In other words, the voltage values may be computed by the following respective equations:

$$V(0)=a*w(0)+T_0, w(0)=t_r(0)-t_1(0)$$

$$V(1)=a*w(1)+T_0, w(1)=t_r(1)-t_1(1)$$

$$V(2)=a*w(2)+T_0, w(2)=t_r(2)-t_1(2)$$

$$V(3)=a*w(3)+T_0, w(3)=t_r(3)-t_1(3)$$

In this case, V(n) represents the voltage value of the n-th sawtooth of the sawtooth-shaped threshold voltage T(t), and w(n) represents the time width of an n-th pulse and corresponds to a value obtained by subtracting the time $t_1$(n) at which the leading edge of the n-th pulse appears from the time $t_r$(n) at which the trailing edge of the n-th pulse appears.

Furthermore, in this case, time delay $t_d$ is present between the actual threshold voltage T(t) and the digital pulse train, as shown in FIG. 3, and thus V(n) may be obtained using the following equation:

$$V(n)=a*(w(0)-t_d)+T_0, w(0)=t_r(0)-t_1(0)$$

In this case, V(n) is the threshold voltage T(t) when the scintillation signal S(t) coincides with the threshold voltage T(t) as a result of the comparison of the signal comparison unit 20. Computing V(n) by means of the above-described method is substantially the same as acquiring the voltage values of the scintillation signal S(t) at a plurality of sampling points (the times at which the trailing edges of a plurality of pulses included in the digital pulse train D(t) appear, i.e., $t_r$(0), $t_r$(1), $t_r$(2), $t_r$(3), etc. in FIG. 3).

Furthermore, the signal recovery unit 30 may acquire the detection time information of the scintillation signal by using the time value $t_1$(0), at which the leading edge of the first pulse of the digital pulse train D(t) appears, in order to recover the scintillation signal S(t).

Accordingly, the signal recovery unit 30 may precisely recover the scintillation signal by using the detection time information and the voltage values at the respective sampling points.

In general, a signal emitted from a radiation detector may be represented by the combination of the following two exponential functions. Accordingly, the signal recovery unit 30 may recover the scintillation signal S(t) by means of a method of obtaining, for example, the constants of the following exponential functions by using a plurality of sampling points:

$$S(t) = \begin{cases} 0, & t < t_0 \\ ae^{-b(t-t_0)}(1 - e^{-c(t-t_0)}), & t \geq t_0 \end{cases}$$

Furthermore, another method for recovering the scintillation signal S(t) may use the following equation:

$$S(t) = \begin{cases} 0, & t < t_0 \\ ax(t), & t \geq t_0 \end{cases}$$

Furthermore, the signal acquisition apparatus 100 according to the embodiment of the present invention may further include an information computation unit 40 configured to compute information about the energy and detection time of the scintillation signal as final detection results based on the recovered signal. The information computation unit 40 may output the time value $t_1(0)$ at which the leading edge of the first pulse appears, which is used during the recovery of the signal, as the detection time information, and may compute the energy information by integrating the recovered signal.

The energy information and detection time information which are output by the information computation unit 40 as final results represent the energy information and arrival time information of the scintillation signal generated by the radiation detector.

Alternatively, in an embodiment of the present invention, it may be possible to directly compute the energy information by using the detection time information and the voltage values at the respective sampling points, rather than computing the energy information by recovering the scintillation signal S(t) and then integrating the recovered scintillation signal S(t).

For this purpose, it may be possible to use, for example, the following equations:

When the coordinates of each of the sampling points are (t(i), v(i)), the energy of the scintillation signal S(t) may be computed by means of the following equation by using a rectangular sum method:

$$e = \sum_{i=0}^{n} v^{(i+1)}(t^{i+1} - t^i)$$

Alternatively, when the coordinates of each of the sampling points are (t(i), v(i)), the energy of the scintillation signal S(t) may be computed by means of the following equation by using a trapezoidal sum method:

$$e = \frac{1}{2}\left(2v^{(1)} - \frac{v^{(2)} - v^{(1)}}{t^{(2)} - t^{(1)}}(t^{(1)} - t^{(0)})\right)(t^{(1)} - t^{(0)}) + \sum_{i=1}^{n} \frac{1}{2}(v^{(i+1)} + v^{(i)})(t^{(i+1)} - t^{(i)})$$

Alternatively, in another method, when the coordinates of each of the sampling points are (t(i), v(i)), the energy of the scintillation signal S(t) may be computed by means of a W width square method:

$$e = \sum_{i=1}^{n} v^{(i)} w^{(i)} \approx \sum_{i=1}^{n} (w^{(i)})^2$$

Meanwhile, a signal acquisition method for acquiring the energy and arrival time information of a scintillation signal by using the signal acquisition apparatus 100 according to an embodiment of the present invention will be described with reference to FIG. 4.

First, when a scintillation signal is generated, the signal acquisition apparatus 100 receives the scintillation signal S(t), generated by a radiation detector, at step S401.

Furthermore, at step S403, the signal acquisition apparatus 100 generates a sawtooth-shaped threshold voltage T(t) which has an initial value $T_0$, increases, and decreases back to the initial value $T_0$ when the increased value becomes larger than the scintillation signal S(t). In this case, the initial value $T_0$ has a value higher than the baseline of the scintillation signal.

Thereafter, at step S405, the signal acquisition apparatus 100 compares the input voltage value of the scintillation signal S(t) with a threshold voltage T(t), and outputs 1 when the scintillation signal S(t) is higher than the threshold voltage T(t), and outputs 0 when the threshold voltage T(t) is higher than the scintillation signal S(t), thereby acquiring a digital pulse train D(t).

In this case, steps S401 to S405 are repeatedly performed until the voltage value of the scintillation signal S(t) becomes equal to or lower than $T_0$ again. Accordingly, the value of the threshold voltage T(t) generated at step S403 is substantially influenced by a comparison result obtained at step S405.

Thereafter, at step S407, the signal acquisition apparatus 100 may recover the scintillation signal S(t) by using the digital pulse train D(t) acquired through the performance of steps S401 to S405.

In this case, the signal acquisition apparatus 100 may compute threshold voltages T(t) at corresponding times by using the times, at which the trailing edges of respective pulses appear, as sampling points, as described above. In this case, the time values at which the trailing and leading edges of the pulses appear and the slopes "a" which the threshold voltages T(t) have may be used.

Thereafter, the signal acquisition apparatus 100 may recover the scintillation signal S(t) by using the computed voltage values at the sampling points.

Thereafter, at step S409, the signal acquisition apparatus 100 may compute the energy information of the scintillation signal by using the recovered scintillation signal S(t). In this case, the energy information may be computed by integrating the recovered signal.

Furthermore, the signal acquisition apparatus 100 may compute the time at which the leading edge of the first pulse of the digital pulse train D(t) appears as detection time information, i.e., the arrival time information of the scintillation signal.

Furthermore, in an embodiment of the present invention, steps S407 and S409 may be replaced with the step of computing the energy of the scintillation signal S(t) by using the digital pulse train D(t) acquired through the performance of steps S401 to S405. In other words, the step of directly computing energy by using the coordinates of the sampling points of the digital pulse train D(t) without recovering the scintillation signal S(t) and then integrating the recovered signal may be performed in place of steps S407 and S409.

In the following, the result of the actual acquisition of a signal using the signal acquisition apparatus 100 and signal acquisition method according to the embodiments of the present invention will be described with reference to FIGS. 5 to 9.

Figure 5:
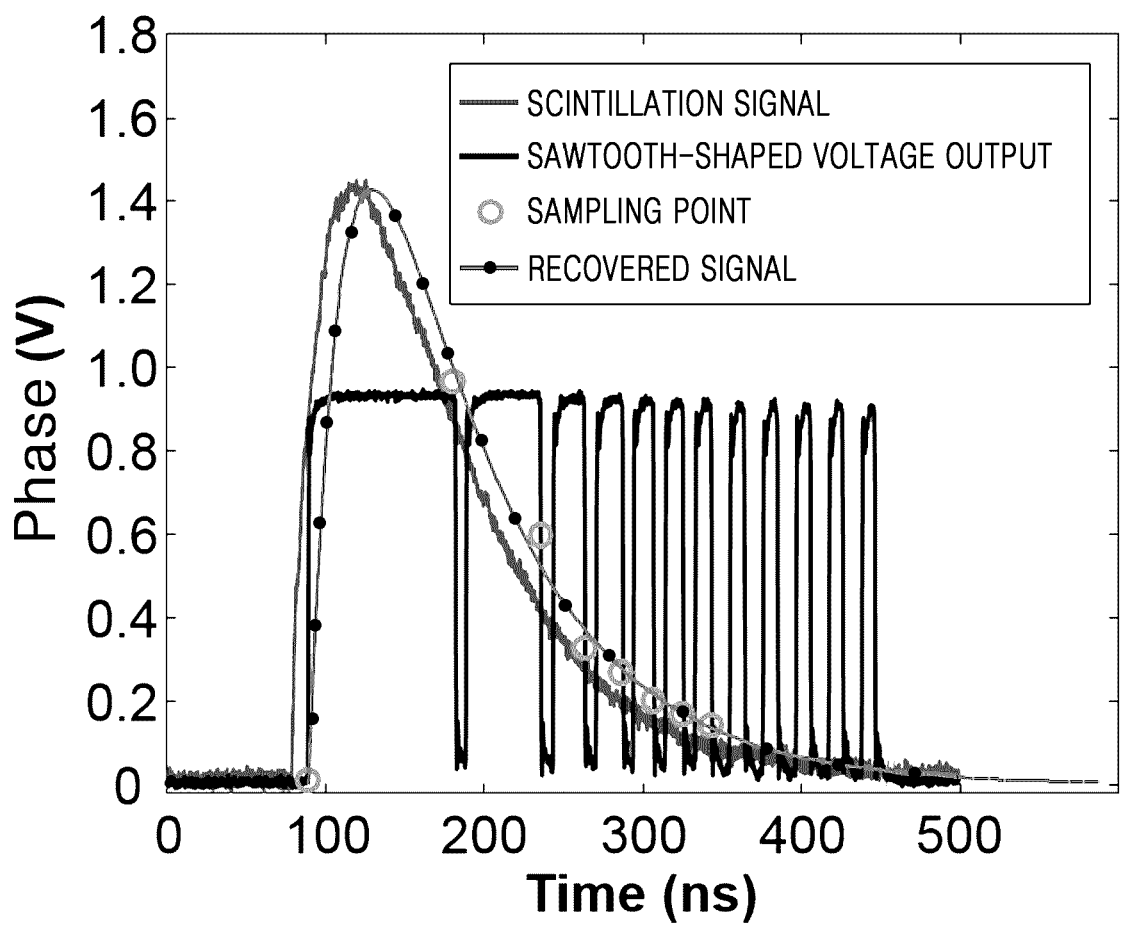
FIG. 5 is a graph showing the comparison between the waveform of a scintillation signal actually reconstructed using the signal acquisition apparatus according to the embodiment of the present invention and the waveform of a scintillation signal acquired via a high-performance analog-to-digital converter (ADC)
Figure 6:
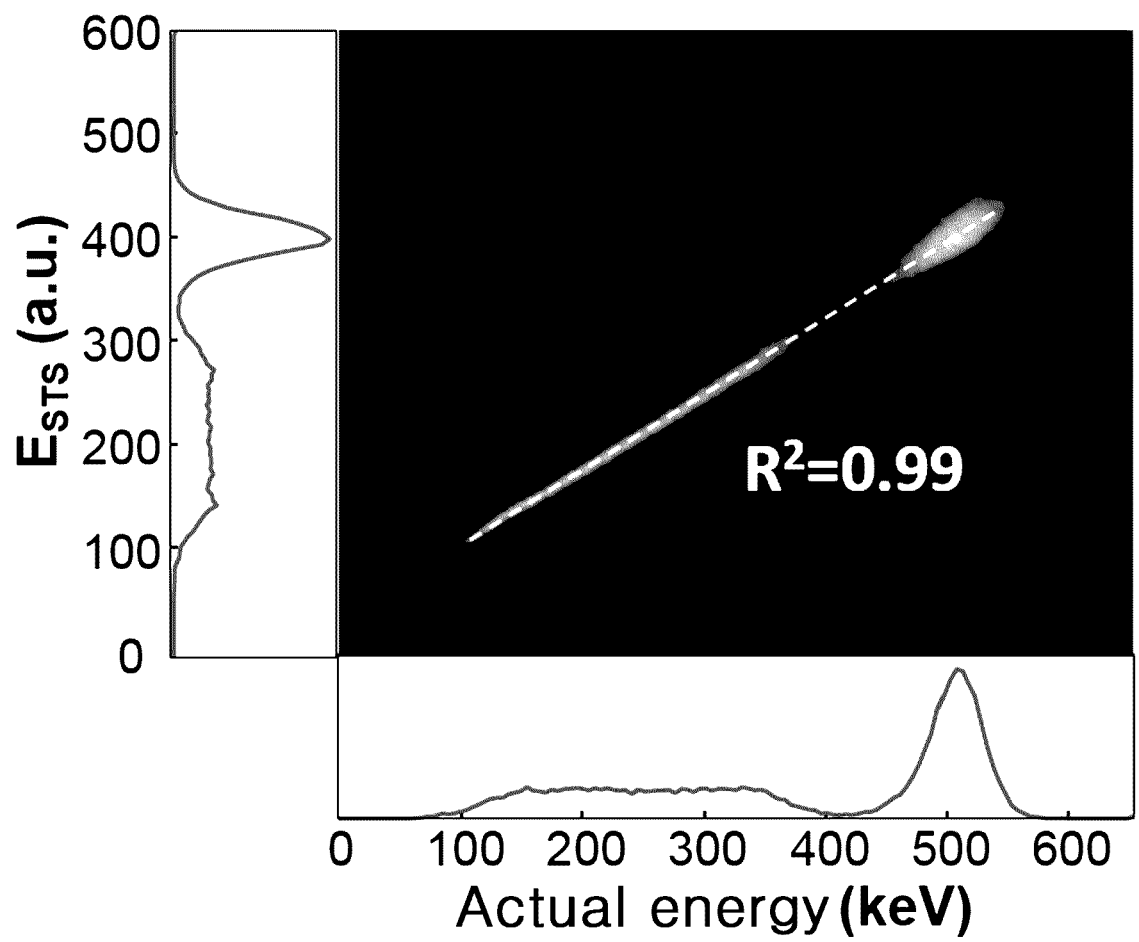
FIG. 6 is a graph showing the energy linearity between the scintillation signal actually reconstructed using the signal acquisition apparatus according to the embodiment of the present invention and the scintillation signal acquired via the high-performance ADC.

FIG. 5 is a graph showing the comparison between the waveform of a scintillation signal actually reconstructed using the signal acquisition apparatus according to the embodiment of the present invention and the waveform of a scintillation signal acquired via a high-performance analog-to-digital converter (ADC). FIG. 6 is a graph showing the energy linearity between the scintillation signal actually reconstructed using the signal acquisition apparatus according to the embodiment of the present invention and the scintillation signal acquired via the high-performance ADC.

Figure 7:
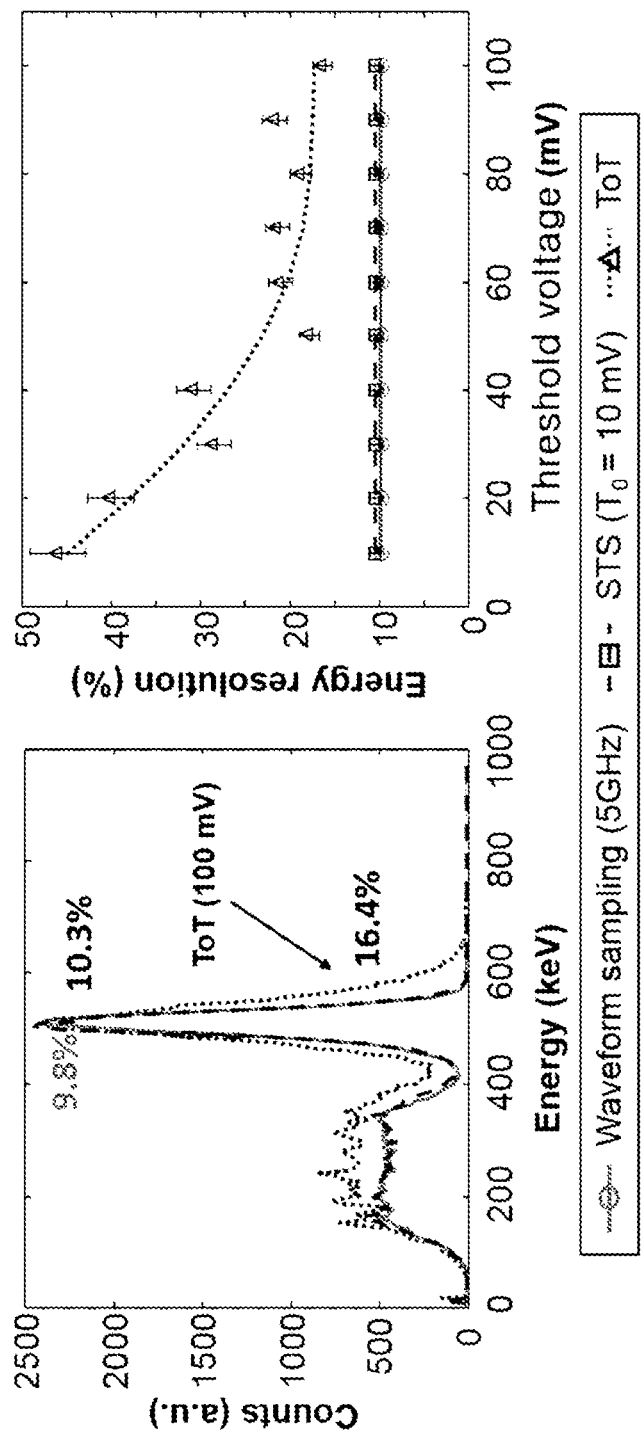
FIGS. 7 and 8 are graphs showing comparisons in performance between the signal acquisition method according to the embodiment of the present invention and conventional signal acquisition methods.
Figure 8:
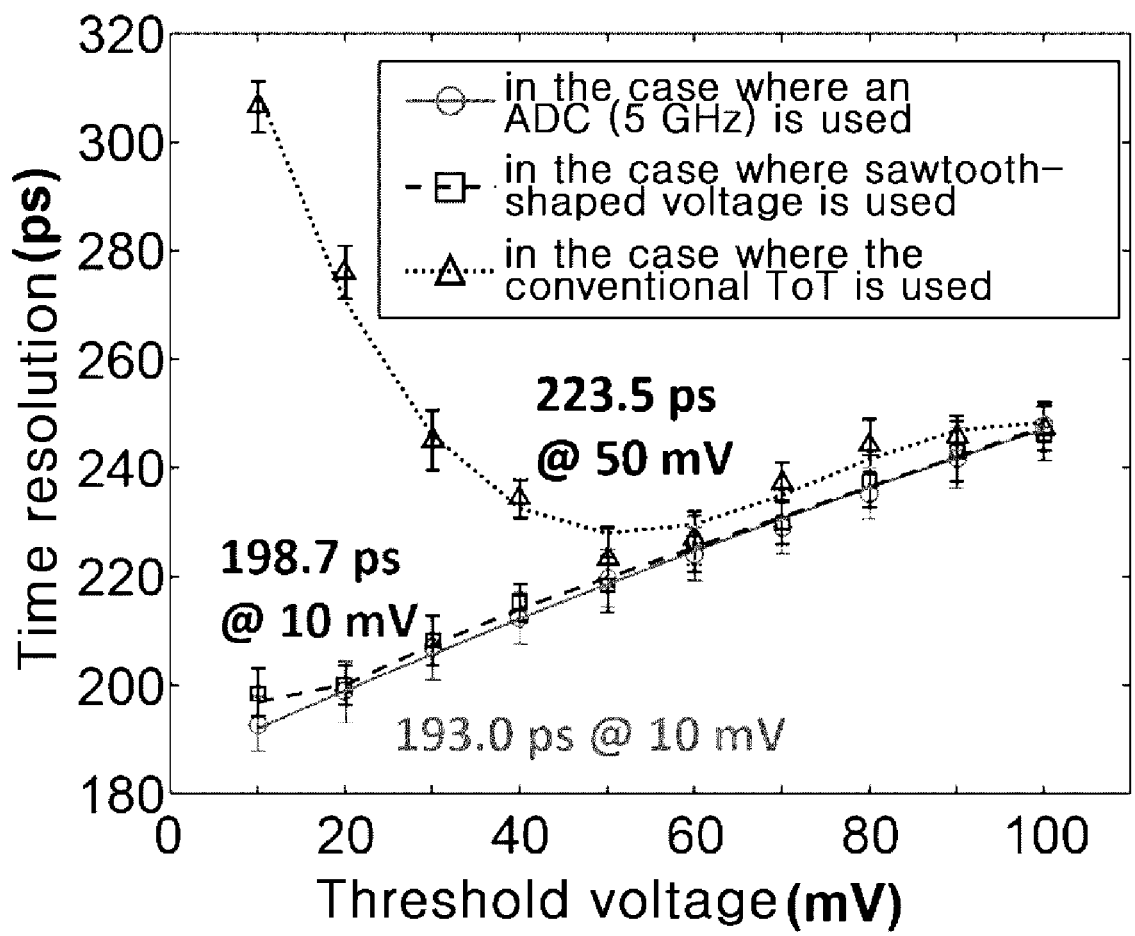
Figure 9:
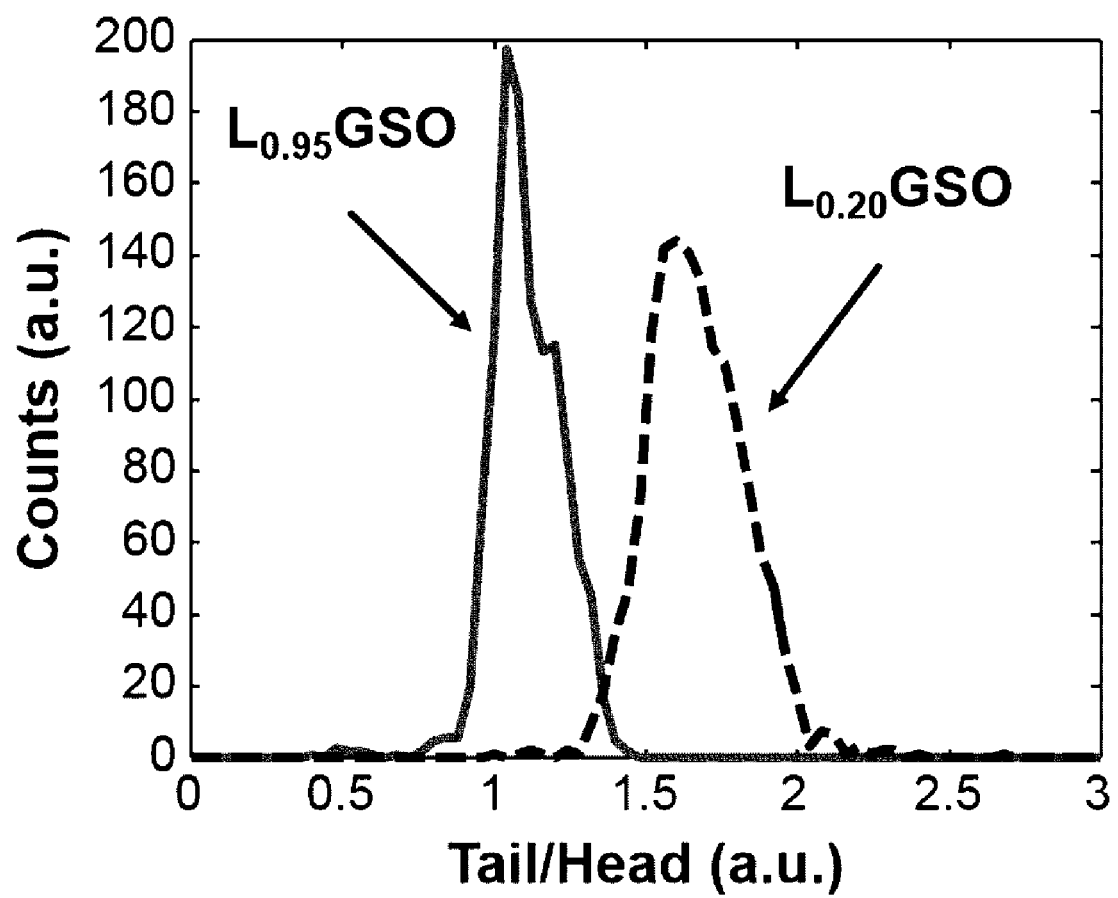
FIG. 9 is a graph indicating that scintillation crystals having different decay times are distinguished from each other by using the signal acquisition method according to the embodiment of the present invention.

Furthermore, FIGS. 7 and 8 are graphs showing comparisons in performance between the signal acquisition method according to the embodiment of the present invention and conventional signal acquisition methods, and FIG. 9 is a graph indicating that scintillation crystals having different decay times are distinguished from each other by using the signal acquisition method according to the embodiment of the present invention.

Referring to FIG. 5, the scintillation signal actually acquired via the high-performance ADC and the recovered signal reconstructed using the signal acquisition method according to the present invention can be seen. It can be seen that the reconstructed signal is recovered with almost no difference from the actual scintillation signal. Furthermore, FIG. 6 shows the relationship between the energy $E_{STS}$ of a gamma ray estimated using the signal acquisition method according to the embodiment of the present invention and the energy of an actual incident gamma ray. It can be seen that the signal acquisition method according to the embodiment of the present invention has high linearity ($R^2$=0.99) in connection with the actual energy, unlike the conventional ToT method.

Furthermore, referring to FIGS. 7 and 8, there can be seen the comparison of energy resolution and coincidence time resolution measured for a pair annihilation gamma ray emitted from $^{22}$Na. Although waveform sampling at 5 GHZ acquired using a method based on a high-speed ADC operating at 5 GHz exhibited the best result, the signal acquisition method STS proposed by the present invention did not exhibit a significant difference. However, the signal acquisition method according to the present invention can be implemented at a considerably lower cost than the high-speed ADC-based method, and has a significant advantage in its scalability. In contrast, it can be seen from FIGS. 7 and 8 that the conventional time-based signal acquisition method, i.e., ToT, has poorer energy and time resolution performance than the proposed method.

Furthermore, referring to FIG. 9, it is seen that the signal acquisition method according to the embodiment of the present invention may accurately distinguish scintillation crystals having different decay times from each other. The ratio of the head to the rail of a scintillation signal of a scintillation crystal $L_{0.95}$GSO having a decay time constant of 40 ns and the ratio of the head to the rail of a scintillation signal of a scintillation crystal $L_{0.20}$GSO having a decay time constant of 60 ns are clearly distinguished from each other.

The term "unit" used herein means software or a hardware component such as a field-programmable gate array (FPGA) or application-specific integrated circuit ASIC, and a "unit" performs any role. However, a "unit" is not limited to software or hardware. A "unit" may be configured to be present in an addressable storage medium, and also may be configured to run one or more processors. Accordingly, as an example, a "unit" includes components, such as software components, object-oriented software components, class components and task components, processes, functions, attributes, procedures, subroutines, segments in program code, drivers, firmware, microcode, circuits, data, a database, data structures, tables, arrays, and variables.

Components and a function provided in "unit(s)" may be coupled to a smaller number of components and "unit(s)" or divided into a larger number of components and "unit(s)."

In addition, components and "unit(s)" may be implemented to run one or more CPUs in a device or secure multimedia card.

Furthermore, a signal acquisition method according to an embodiment of the present invention may be implemented as a computer program (or a computer program product) including computer-executable instructions. The computer program includes programmable machine instructions which are processed by a processor, and may be implemented in a high-level programming language, an object-oriented programming language, an assembly language, a machine language, or the like. Furthermore, the computer program may be stored in a tangible computer computer-readable storage medium (for example, memory, a hard disk, a magnetic/optical medium, a solid-state drive (SSD), or the like).

Accordingly, a signal acquisition method according to an embodiment of the present invention may be implemented in such a manner that the above-described computer program is executed by a computing apparatus. The computing apparatus may include at least some of a processor, memory, a storage device, a high-speed interface connected to memory and a high-speed expansion port, and a low-speed interface connected to a low-speed bus and a storage device. These individual components are connected using various buses, and may be mounted on a common motherboard or using another appropriate method.

In this case, the processor may process instructions within a computing apparatus. An example of the instructions is instructions which are stored in memory or a storage device in order to display graphic information for providing a Graphic User Interface (GUI) onto an external input/output device, such as a display connected to a high-speed interface. As another embodiment, a plurality of processors and/or a plurality of buses may be appropriately used along with a plurality of pieces of memory. Furthermore, the processor may be implemented as a chipset composed of chips including a plurality of independent analog and/or digital processors.

Furthermore, the memory stores information within the computing device. As an example, the memory may include a volatile memory unit or a set of the volatile memory units. As another example, the memory may include a non-volatile memory unit or a set of the non-volatile memory units. Furthermore, the memory may be another type of computer-readable medium, such as a magnetic or optical disk.

Furthermore, the storage device may provide a large storage space to the computing device. The storage device may be a computer-readable medium, or may be a configuration including such a computer-readable medium. For example, the storage device may also include devices within a storage area network (SAN) or other elements, and may be a floppy disk device, a hard disk device, an optical disk device, a tape device, flash memory, or a similar semiconductor memory device or array.

According to at least one embodiment of the present invention, there are provided the time-based signal acquisition apparatus and method using sawtooth-shaped threshold voltage, which are intended to acquire energy and time information from a scintillation signal.

According to at least one embodiment of the present invention, there are provided the time-based signal acquisition apparatus and method using sawtooth-shaped threshold voltage, which are capable of precisely estimating energy and time information from a scintillation signal without requiring the use of an expensive apparatus.

According to at least one embodiment of the present invention, there are provided the time-based signal acquisition apparatus and method using sawtooth-shaped threshold voltage, which are unsusceptible to noise because information is acquired from various sampling points.

The advantages which can be acquired from the present invention are not limited to the above-described advantages, and other advantageous which have not been described will be clearly understood from the foregoing description by those having ordinary knowledge in the art to which the present invention pertains.

The above-described detailed description is intended merely to illustrate the present invention. It will be understood that those having ordinary knowledge in the art to which the present invention pertains can easily make modifications and variations without departing from the technical spirit and essential features of the present invention. Therefore, the above-described embodiments are illustrative and are not limitative in all aspects. For example, each component described as being in a single form may be practiced in a distributed form. In the same manner, components described as being in a distributed form may be practiced in an integrated form.

The scope of the present invention should be defined by the attached claims, rather than the detailed description. Furthermore, all modifications and variations which can be derived from the meanings, scope and equivalents of the claims should be construed as falling within the scope of the present invention.

What is claimed is:

1. A signal acquisition apparatus for acquiring information of a scintillation signal, the signal acquisition apparatus comprising:
   a sawtooth-shaped voltage generation unit configured to generate a sawtooth-shaped threshold voltage which increases when the threshold voltage is smaller than a voltage value of the scintillation signal and which decreases to an initial value when the threshold voltage is larger than the voltage value of the scintillation signal;
   a signal comparison unit configured to receive the scintillation signal, to compare the voltage value of the scintillation signal with the threshold voltage, and to generate a digital pulse train; and
   a signal recovery unit configured to recover the scintillation signal by using the digital pulse train.

2. The signal acquisition apparatus of claim 1, wherein the signal comparison unit comprises a comparator configured to output 1 when the voltage value of the scintillation signal is larger than the threshold voltage and to output 0 when the voltage value of the scintillation signal is smaller than the threshold voltage.

3. The signal acquisition apparatus of claim 1, wherein the sawtooth-shaped voltage generation unit comprises:
   a switch configured to be selectively connected to a power supply for constantly outputting the initial value in response to a result of the comparison of the signal comparison unit; and
   a low-pass filter configured to generate the threshold voltage increasing constantly in a state where the switch is open.

4. The signal acquisition apparatus of claim 1, wherein the signal recovery unit computes values of the voltage at a plurality of sampling points by means of increasing slopes of the threshold voltage by using times, at which trailing edges of pulses included in the digital pulse train appear, as the sampling points.

5. The signal acquisition apparatus of claim 4, wherein the signal recovery unit recovers the scintillation signal by using the values of the voltage at the plurality of sampling points.

6. The signal acquisition apparatus of claim 4, wherein the signal recovery unit uses information about times, at which leading and trailing edges of pulses of the digital pulse train appear, in order to compute the values of the voltage at the plurality of sampling points.

7. The signal acquisition apparatus of claim 6, wherein the signal recovery unit additionally uses delay time information, in addition to the information about times at which leading and trailing edges of pulses of the digital pulse train appear, in order to compute the values of the voltage at the plurality of sampling points.

8. The signal acquisition apparatus of claim 4, further comprising an information computation unit configured to compute the information of the scintillation signal by using the scintillation signal recovered by the signal recovery unit.

9. The signal acquisition apparatus of claim 8, wherein the information computation unit acquires energy information of the scintillation signal by integrating the scintillation signal recovered by the signal recovery unit.

10. The signal acquisition apparatus of claim 8, wherein the information computation unit acquires detection time information by using a time at which a leading edge of a first pulse of the digital pulse train appears.

11. The signal acquisition apparatus of claim 1, further comprising an information computation unit configured to acquire energy information of the scintillation signal by using the digital pulse train generated by the signal comparison unit.

12. A signal acquisition method which is performed by a signal acquisition apparatus for acquiring information of a scintillation signal, the signal acquisition method comprising:
   receiving a scintillation signal;
   generating a sawtooth-shaped threshold voltage which increases when the threshold voltage is smaller than a voltage value of the scintillation signal and which decreases to an initial value when the threshold voltage is larger than the voltage value of the scintillation signal;
   comparing the voltage value of the scintillation signal with the threshold voltage, and generating a digital pulse train; and
   computing at least one of energy information and detection time information of the scintillation signal based on the digital pulse train,
   wherein the computing comprises:
   recovering the scintillation signal based on the digital pulse train; and
   computing the energy information of the scintillation signal by using the recovered scintillation signal.

13. The signal acquisition method of claim 12, wherein the computing comprises:
   computing values of the voltage at a plurality of sampling points by means of slopes of the threshold voltage by using times, at which trailing edges of pulses included in the digital pulse train appear, as the sampling points; and recovering the scintillation signal by using the values of the voltages at the sampling points.

14. The signal acquisition method of claim 12, wherein the computing comprises:

acquiring a time, at which a leading edge of a first pulse of the digital pulse train appears, as the detection time information.

* * * * *